US005434575A

United States Patent [19]

Jelinek et al.

[11] Patent Number: 5,434,575

[45] Date of Patent: Jul. 18, 1995

[54] PHASED ARRAY ANTENNA SYSTEM USING POLARIZATION PHASE SHIFTING

[75] Inventors: Carl O. Jelinek; Daniel W. Drago, Jr., both of Camarillo; Richard C. Dempsey, Chatsworth, all of Calif.

[73] Assignee: California Microwave, Inc., Sunnyvale, Calif.

[21] Appl. No.: 189,023

[22] Filed: Jan. 28, 1994

[51] Int. Cl.[6] .................... H01Q 21/06; H01Q 21/24; H04B 7/10

[52] U.S. Cl. .................... 342/365; 342/374; 342/373

[58] Field of Search .................... 342/373, 374, 363, 365

[56] References Cited

U.S. PATENT DOCUMENTS

| | | | |
|---|---|---|---|
| 3,157,878 | 11/1964 | Hansel et al. | 343/113 |
| 3,725,943 | 4/1973 | Spanos . | |
| 3,949,407 | 4/1976 | Jadgmann et al. | 343/895 |
| 3,993,999 | 11/1976 | Hemmi et al. . | |
| 4,123,759 | 10/1978 | Hines et al. . | |
| 4,414,550 | 11/1983 | Tresselt | 343/700 |
| 4,418,351 | 11/1983 | Fackler | 343/797 |
| 4,635,065 | 1/1987 | Mori et al. | 342/435 |
| 4,649,391 | 3/1987 | Tsuda et al. | 343/153 |
| 4,682,181 | 7/1987 | Dumas et al. | 343/789 |
| 4,962,383 | 10/1990 | Tresselt | 343/700 |

*Primary Examiner*—Theodore M. Blum
*Attorney, Agent, or Firm*—Robbins, Berliner & Carson

[57] ABSTRACT

A circularly polarized phased array antenna system for both reception and transmission applications includes a plurality of planar radiating (or receiving) elements, a switching matrix for each radiating element, a beamforming network and a transmit/receive module. Each planar element includes 4×N radially disposed segments that may be selectively connected with the four modes of a circularly polarized signal such that two opposing segments function as the two respective arms of a dipole radiating element and two orthogonal such dipoles function as a crossed pair of dipoles for receiving or transmitting the circularly polarized signal. The switching matrix and the beamforming network cooperate to determine the polarization phase of the radiating element by commutating the four modes of the circularly polarized signal to any four orthogonal segments of the radiating element. The polarization sense may be changed between right-hand and left-hand circular either within the bandforming network, or by causing the switching network to reverse the two signal modes connected across one of the dipoles. If N is greater than 1, then by electrically connecting up to N−1 nearby segments to thereby increase the effective angle subtended by each arm, the bandwidth may be increased while still permitting the radiating element's polarization phase to be determined in increments equal to the angle subtended by one segment; by selectively using either an odd or even number of segments to define the effective angle subtended by each dipole arm, the relative phase of that element may be determined in increments equal to half the angle subtended by one segment.

20 Claims, 7 Drawing Sheets

PHASED ARRAY ANTENNA SYSTEM USING POLARIZATION PHASE SHIFTING

FIELD OF THE INVENTION

The present invention relates generally to antennas and more particularly to phased array antenna systems.

BACKGROUND ART

It is generally known by those practicing antenna design that a flat microstrip dipole antenna arranged parallel to and in close spaced relationship with a ground plane conductor will exhibit a broadside antenna pattern, that is, a generally hemispherical antenna pattern on the dipole side of the ground plane forming the flat side of the hemisphere. If, however, two or more such dipoles are arranged parallel to the ground plane in the same close spaced relationship with the ground plane conductor, separated from one another by approximately one half wavelength (center to center) and fed with different phases of the same signal, the array of dipoles will form a narrower beam in a direction determined by the phase. Such an array is commonly referred to as a phased array antenna.

Size, weight, cost and signal loss are primary parameters of interest for designing phased array antennas, particularly with respect to conformal antenna systems. For example, mobile antenna applications need low profile, directional antenna configurations that can conveniently be made to conform to the shape of a mobile unit while providing excellent beam steering and electromagnetic properties. Additionally, safety, fuel economy, and freedom from vibration have become important factors in vehicle mounted antenna design, particularly on vehicles intended for use at higher speeds. Conventional projecting-type antennas mounted commonly cause drag to the vehicle and vibration to the antenna while the vehicle is in motion.

Hardware including relatively bulky and expensive discrete elements is typically required to mechanically or electronically steer the resultant beam, thus causing additional problems with respect to size, weight, cost and loss. Electronic steering is conventionally accomplished by means of individual electronically controlled phase shifters (such as ferrite phase shifters or digital delay lines) associated with each element of a phased array to steer the beam by progressively shifting the phases of the signals radiated by the individual radiators.

What is needed therefore is a conformal phased array antenna system that does not require bulky and expensive phase shifters and that is nevertheless capable of providing controlled phase shifts between elements in the array to electronically steer the beam.

DISCLOSURE OF INVENTION

The preceding and other shortcomings of prior art systems are addressed and overcome by various aspects of the present invention, which transmits or receives circularly polarized radiation having a switchable polarization phase relative to the other elements of the array. In a first such aspect, a phased array antenna system includes a plurality of radiating elements each containing 4.N radially disposed segments with each pair of opposing segments functioning as a dipole and four orthogonally disposed segments functioning as a pair of crossed dipoles for transmitting or received a circularly polarized signal, as well as a switching network associated with each of the radiating elements for determining the polarization phase of the radiating element relative to the other elements of the array by commutating the four modes of the circularly polarized signal to four orthogonal segments of the radiating element having a spatial orientation relative to the other radiating elements corresponding to the desired polarization phase, and a beamforming network for converting the received or transmitted signal from or to the four signal modes.

In another aspect, the present invention provides a method for antenna beam steering, including the steps of determining for each radiating element a desired polarization phase, providing in each radiating element with 4.N radially disposed segments, associating each of the 4.N radially disposed segments with a respective orthogonal arm of at least N crossed pairs of dipoles, and commutating the four signal modes of a circularly polarized signal to the four arms of one of the crossed dipole pairs such that a predetermined signal mode is connected to a segment having a radial orientation corresponding to the desired polarization phase.

In accordance with other more specific aspects of the invention, the switching means may be implemented as an array of simple switching elements, the bandwidth may be increased by electrically connecting each of the four selected segments to one or more adjacent segments, the direction of polarization may be changed between right-hand and left-hand circular, and the switching network may be integrally formed with the radiating segments over a common substrate.

BRIEF DESCRIPTION OF THE DRAWINGS

The foregoing and additional features and advantages of this invention will become further apparent from the detailed description and accompanying drawing figures that follow. In the figures and written description, numerals indicate the various features of the invention, like numerals referring to like features throughout for both the drawing figures and the written description, and.

DETAILED DESCRIPTION OF BEST MODE

As will be discussed in greater detail below, the present invention provides a phased array antenna system including an array of circularly polarized antenna radiating elements formed of radially disposed segments, each radiating element functioning as a pair of crossed dipoles for receiving or transmitting a circularly polarized signal having a switchable polarization phase relative to the other elements of the array, and an improved mechanism for beam steering using an electronic switching matrix to select the relative polarization phase of each of the radiating elements.

The switching matrix may be implemented with microstrip technology, using diode switches thus allowing the antenna to be steered over a wide field of view. Electronic phase shifting is provided at the element level, thus providing for fine control of phase. By rotating the polarization phase of the elements with respect to each other, the beam is spatially scanned. Additionally, nearby segments of a radiating element may be electrically connected to form a broader element, resulting in a wider bandwidth for the element. The present invention is fully reciprocal, and can, if desired, use one polarization sense (for example, right-hand circular) for transmitting and the other polarization sense (for example, left-hand circular) for receiving, whereby the present invention may find utility as a transponder antenna or in other full duplex applications.

Figure 1:
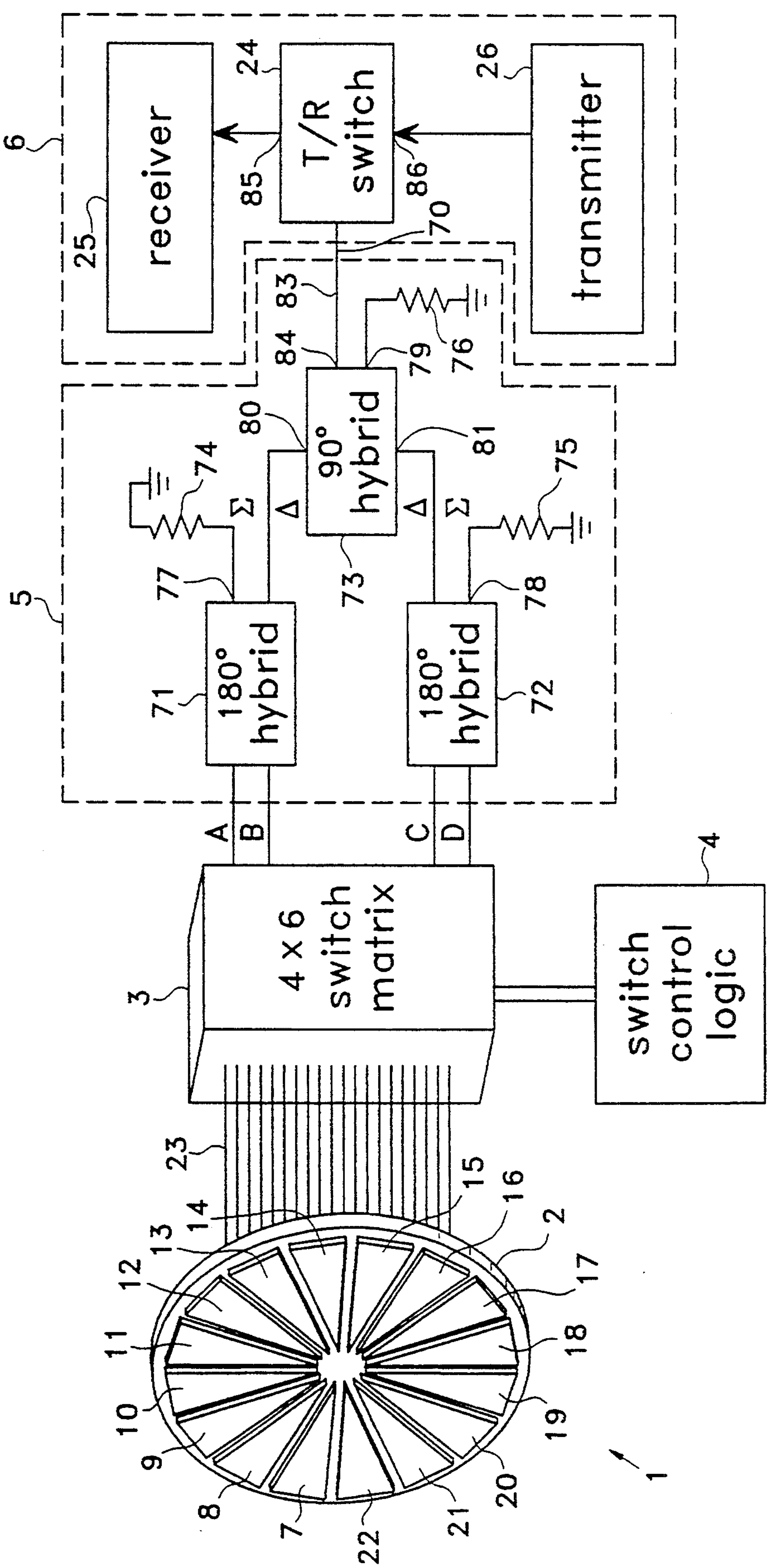
FIG. 1 is an illustration of a single element of a phased array antenna system including a 16-segment radiating element suitable for use with the present invention.

Referring to FIG. 1, antenna subsystem includes a radiating element 2, 4×16 switching matrix 3, control logic 4, beamforming network 5, and transmit/receive module 6. Although radiating element 2 is depicted as having 16 segments 7–22 and although 16 elements is preferred for many applications, it should be understood that the number of segments 7–22 contained in each radiating element 2 may be more or less than 16. The invention is applicable even to elements having only four segments which permits a switchable polarization phase shift of 90°; however, a finer phase shift resolution can be obtained by increasing the number of segments in the radiating element. For the purposes of the present description of the FIG. 1 embodiment, it may be assumed that radiating element 2 has sixteen circularly disposed segments 7–22 that are individually coupled over feed lines 23 to 4×16 switching matrix 3, thereby providing for a switchable phase shift of $$\frac{360}{16} = 22.5°.$$

Switching matrix 3, under the control of control logic 4, determines the appropriate polarization phase shift for each radiating element 2 by selecting to which of the segments 7–22 each of the four signal modes A, B, C, and D of a circularly polarized signal is connected. Beamforming network 5, coupled between switching matrix 3 and transmit/receive module 6, converts the input signal (if the system is being used as a transmitter) into the four signal modes A, B, C, D or converts the four signal modes A, B, C, D into an output signal (if the system is being used as a receiver), and also may be used to determine the polarization of the resultant signal as right-hand or left-hand circular. Transmit/receive module 6 allows for transmission and reception applications and includes a transmit/receive switch 24 for protecting the receiver 25 from power from the transmitter 26. Switching matrix 3, beamforming network 5 and transmit/receive module 6 may be assembled from commercially available components; however, as will subsequently be described with reference to FIG. 5, it is contemplated that at least the switching matrix 3' will be integrally manufactured with the radiating element 2''' on a common dielectric substrate such as the conformal array structure 27 of FIG. 5, thus reducing the size and cost of antenna system and allowing it to be conformally mounted for ground, airborne and space based applications. Moreover, if each element 2 is provided with a separate transmit/receive module 6, the power is distributed, thus allowing for the use of lower power devices for each element. Moreover, low noise amplifiers may be included close to each element, thus further lowering the overall noise figure for the system. In particular, an array of individual such low noise amplifiers may be connected directly to each feed point of each element segment. Thus, for a 16-segment radiating element 2, 16 low noise amplifiers could be utilized.

Figure 5:
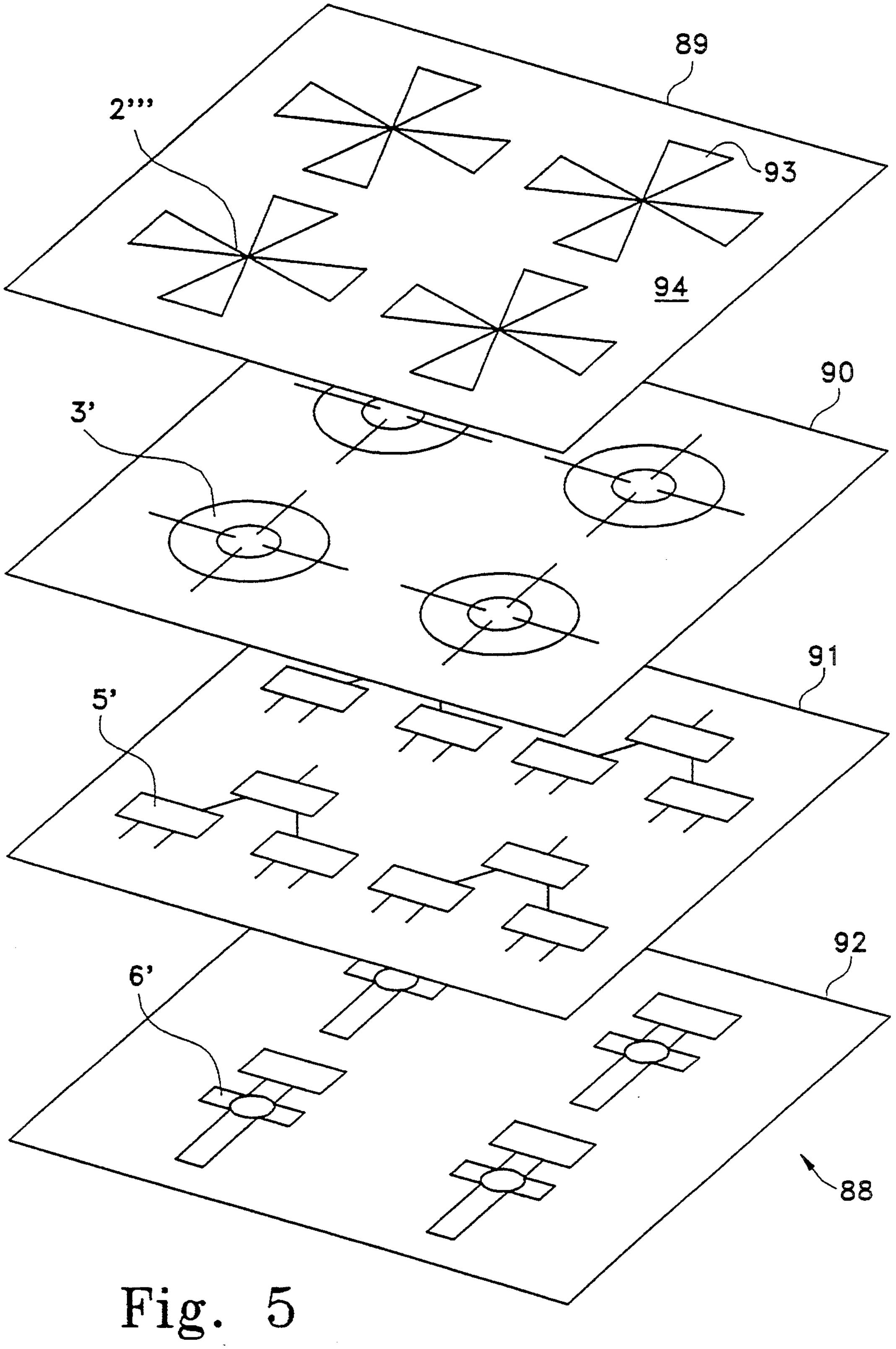
FIG. 5 is an exploded view of the layers used to form a conformal phased array antenna system of 4-segment radiating elements integrally formed with a switching network and a beamforming network over a common substrate.

In accordance with the present invention, each radiating element, such as the 16-segment radiating element 2 shown in FIG. 1 or the 4-segment radiating element 2''' shown in FIG. 5, includes a plurality of radially disposed segments that may be organized in the form of one or more crossed dipole pairs AB, CD that may be fed with the four signal modes of a circularly polarized signal. For example, in the case of the 16-segment radiating element 2. shown in FIG. 1, segment 7 may function as arm A and segment 15 may function as arm B of dipole AB; arms C and D of dipole CD may be formed by segment 11 and segment 19, respectively. In accordance with the invention, a selected pair of crossed dipoles is coupled to the four signal modes A, B, C and D through a switching network, such as switching matrix 3 shown in FIG. 1. It should be understood that any particular segment, for example segment 7, even if selected as an arm of a particular functional crossed dipole pair AB, CD, the segment need not be always associated with the same arm A; it could equally well function as arms B, C, or D; the only limitation is that in each functional crossed pair of dipoles, the arms A, B of one dipole pair AB be perpendicular to the arms A, B of the other pair AB. In the interest of clarity, the dipole arm being fed with the A signal mode will be designated arm A, the dipole arm being fed with the B signal mode will be designated arm C, the dipole arm being fed with the C signal mode will be designated arm C, and the dipole arm being fed with the D signal mode will be designated arm D.

4×16 switching matrix 3 may be assembled from commercially available components such as General Microwave's SP16T non-reflective 1×16 switch, which operates from 2 to 18 Ghz with a maximum insertion loss of 6 Db. Since any of the 16 segments 7–22 can be connected to the A signal mode, the relative polarization phase of 16-segment radiating element 2 can be incremented in steps of $$\frac{360}{16} = 22.5°.$$

Conventional analog or digital electronic phase shifting at the element level generally allows for finer control of phase, but 22.5° is believed to be more than adequate for many applications. If required, more segments may be used per radiating element to obtain a finer phase shift resolution. Alternatively, by connecting either even or odd numbers of adjacent segments, the effective orientation of the dipole will be oriented either between two adjacent segments (as in FIG. 4) or along the center of a segment (as in FIGS. 1 and 6), thereby effectively doubling the resolution.

In accordance with a preferred embodiment of the invention, switching matrix 3 has a 4×4.N configuration, where 4.N is the number of segments in the radiating element. For example, to switch the 16-segment radiating element 2 shown in FIG. 1, switching matrix 3 would have a 4×16 configuration. To switch the 8-segment radiating element 2′ shown in FIG. 2 and the 12-segment radiating element 2″ shown in FIG. 4, the switching matrix would have 4×8 and 4×12 configurations, respectively. Switching matrix 3 is controlled by switch control logic 4, that may use a simple table lookup scheme to determine the appropriate switch closures and timing for each beam position and communicates with switching matrix 3 over a conventional control bus. In particular, the lookup table of control logic 4 may be readily derived from the conventional control logic used to establish the required timing and phase of the elements of a conventional phased array, and for each radiating element 2, selects the segment 7–22 which has a radial orientation most closely matching the desired polarization phase relative to the other elements of the array and causes the switching network to switch the A signal mode to the thus-selected segment. The lookup table similarly determines which segments are oriented at +90°, 180°, and 270° relative to the selected segment, and causes these segments to be connected to the C, B and D signal modes, whereby the four signal modes A, B, C and D of a circularly polarized signal may be commutated to the four segments forming a selected pair of crossed dipoles of the radiating element, with the polarization phase of the resultant signal being at most about 11° from optimum (even less if the above mentioned means are employed to provide a finer phase resolution).

Figure 2:
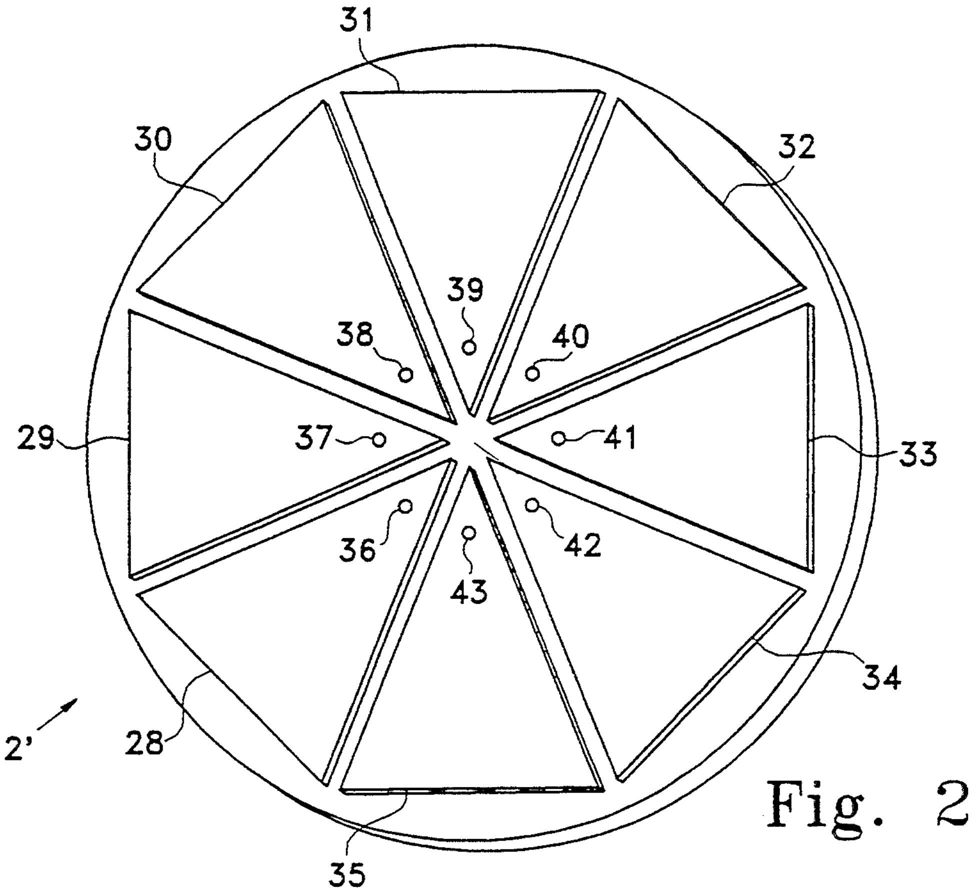
FIG. 2 is a front view of an alternative 8-segment radiating element.

Referring to FIG. 2, which shows an alternate embodiment of a radiating element 2′ with 8 segments 28–35, it will be seen that feed points 36–43 for segments 28–35 in 8-segment radiating element 2′ are located close to the center area of each segment, in a manner analogous to what is conventionally done with the individual arms of conventional crossed dipole radiating elements. For example, feed point 42 is located close to the tip of segment 34 and feed point 38 is located close to the tip of segment 30.

Figure 3:
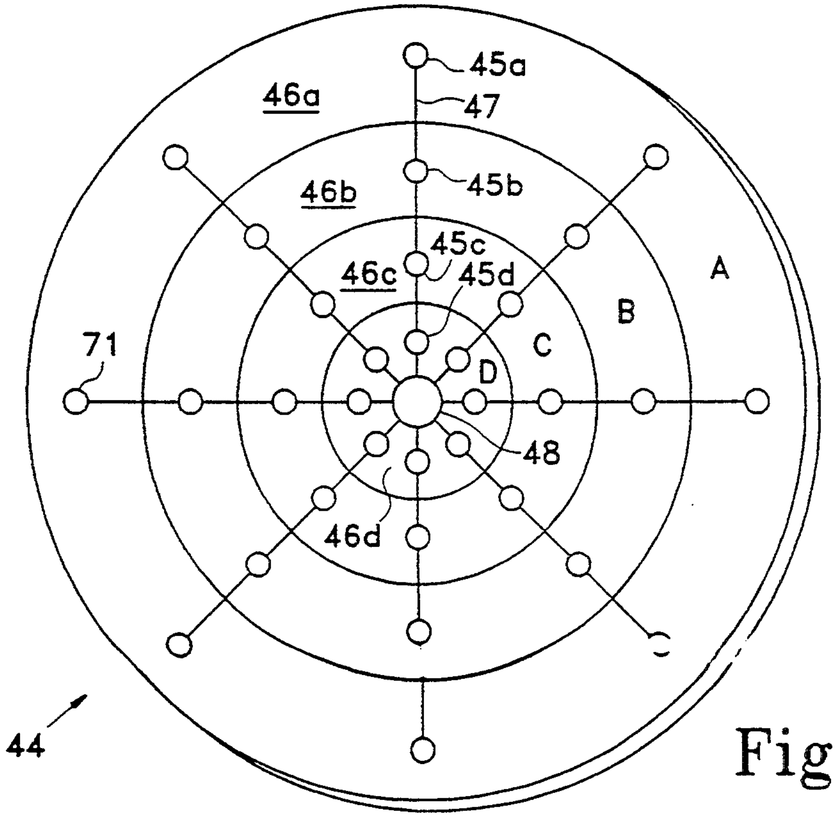
FIG. 3 is a schematic of a conformal matrix switch design configuration for the 8-segment radiating element shown in FIG. 2.

FIG. 3 is an illustration of a conformal matrix switch 44 provided on the rear of the 8-segment radiating element 2′ shown in FIG. 2. Referring to FIGS. 2 and 3, it will be seen that four gates 45*a*–45*d* may be provided at the rear of each of the8 segments 28–35, disposed in four concentric rings 46*a*–46*d* including outer ring 46*a*, second ring 46*b*, third ring 46*c* and inner ring 46*d* connected (see FIG. 5) respectively to the four signal modes A, B, C, and D. Each set of gates 45*a*–45*d* is connected to a respective feed point (for example feed point 36) of its respective segment (for example segment 28) by a respective radial transmission line 47 connecting the four gates 45*a*–45*d* to a respective feed point 36–43 via the dielectric material at the center 48 of conformal matrix switch 44.

Figure 4:
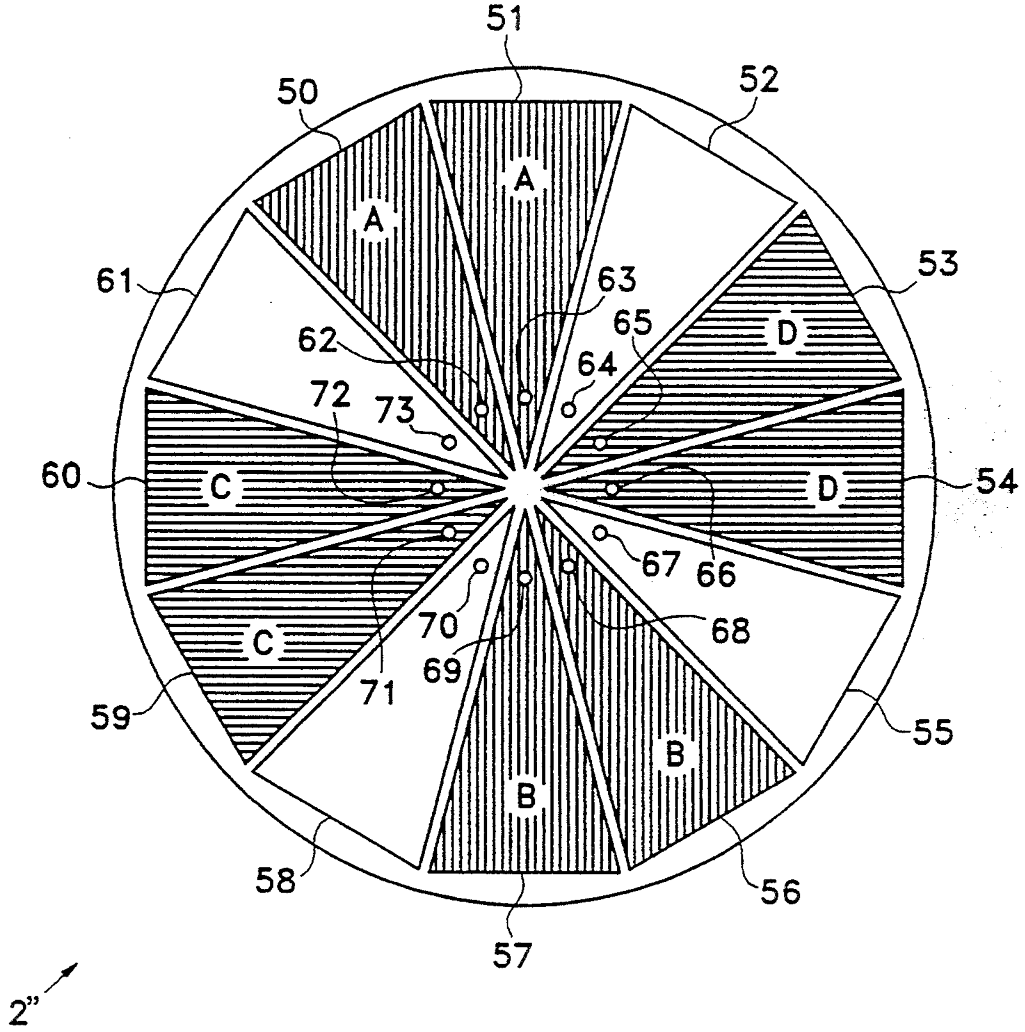
FIG. 4 is a front view showing how eight segments of a 12-segment radiating element may be used to form a crossed dipole pair whose arms each subtend an angle greater than that of a single segment.

In accordance with another aspect of the invention, as shown in FIG. 4, the feed points of nearby segments may be electrically connected to form a dipole arm subtending an angle greater than one segment. For example, to increase the bandwidth of the radiating array 2″ in FIG. 4 which has 12 segments 50–61, feed points 62 and 63 of adjacent segments 50 and 51 are electrically connected together so that segments 50 and 51 form one half AA of dipole pair AABB while segments 56 and 57 are similarly electrically connected via their respective feed points 68 and 69 to form the other half BB of dipole pair AABB. Thus, contrary to the construction of conventional crossed dipole radiating elements, one dipole arm AA may include more than one segment 50, 51 and more than one feed point 62, 63.

Referring again to FIG. 1, Beamforming network 5 is coupled to ports A, B, C and of switching matrix 3 and port 70 of transmit/receive module 6. Beamforming network 5 includes hybrid devices 71, 72 and 73 that may be implemented by conventional microcircuitry for selecting the polarization of the resultant signal as right-hand or left-hand circular. Hybrid devices 71 and 72 may be four-port junction devices providing 180° phase shifts, while hybrid device 73 is a four-port junction device providing a 90° phase shift. Terminating resistors 74, 75 and 76 are placed on the unused ports 77, 78 and 79 of hybrid devices 71, 72 and 73, respectively.

The present invention is fully reciprocal and can, if desired, be arranged for transmitting as well as receiving, whereby the present invention may be applied as a transponder antenna in half duplex and full duplex applications. During transmission, beamforming network 5 receives power at port 70 and apportions the energy on ports A, B, C and D of switching matrix 3. During reception, signal modes A and B from switching matrix 3 are combined in first 180° hybrid device 71 to form a first pair of sum (Σ) and difference (Δ) mode signals. The first sum signal Σ is terminated at port 77; the first difference signal Δ is applied to a corresponding port 80 of 90° hybrid device 73. Similarly, signal modes C and D from switching matrix 3 are combined in the other 180° hybrid device 72 to form a second pair of sum-and-difference signals, with the second sum mode signal being terminated at port 78 and the second difference mode signal being applied to the other port 81 of 90° hybrid device 73. Hybrid device 73 thus combines the two difference mode signals Δ to derive a right-hand circularly polarized signal 82 and a left-hand circularly polarized signal 83 at respective ports 84and 79.

Beamforming network 5 is also coupled to transmit/receive module 6 that includes transmitter 26 and receiver 25. Transmit/receive module 6 is shown in a generalized form; its specific configuration will be established in known fashion from the particular application. Transmit/receive module 6 may include transmit/receive switch 34 having receive and transmit ports 85, 86 connected to receiver 25 and transmitter 26 and a third port 87 connected to port 70 of 90° hybrid 73, for half or full duplex operation. Alternately, receiver 25 may be directly connected to port 84 associated with the right-hand polarized signal and transmitter 26 to port 79 associated with the left-hand polarized signal, thus permitting simultaneous transmission and reception each with a different sense of polarization.

A phased array antenna system includes a plurality of radiating elements. Accordingly, a phased array antenna system could be readily constructed in accordance with the present invention, with each radiating element 2 having its own associated switching matrix 3; however, the beamforming network 5 and/or the transmit/receive module 6 could be shared by many radiating elements 2, with the power to or from the different radiating elements 2 being tapered in known fashion to minimize unwanted side lobes.

Referring now to FIG. 5, an alternate embodiment will be described in which the radiating elements, switching matrices, beamforming networks and transmit/receive modules are formed on stacked layers of dielectric material forming an integrated conformal array which would be suitable for many ground, airborne and space based applications. Conformal array structure 88 includes 4-segment radiating elements 2''' located in a first layer 89, conformal switching matrices 44' located in a second layer 90, beamforming networks 5' located in a third layer 91, and transmit/receive modules 6' located in a fourth layer 92. For example, each radiating element 2''' may be in the form of four metalized segments 93 on a dielectric substrate 94. The surface of radiating elements 2''' may be covered by radio frequency transparent material; each element 2''' is preferably conformally mounted on the surface of a vehicle skin so that its radiation pattern is directed away from the vehicle.

Figure 6:
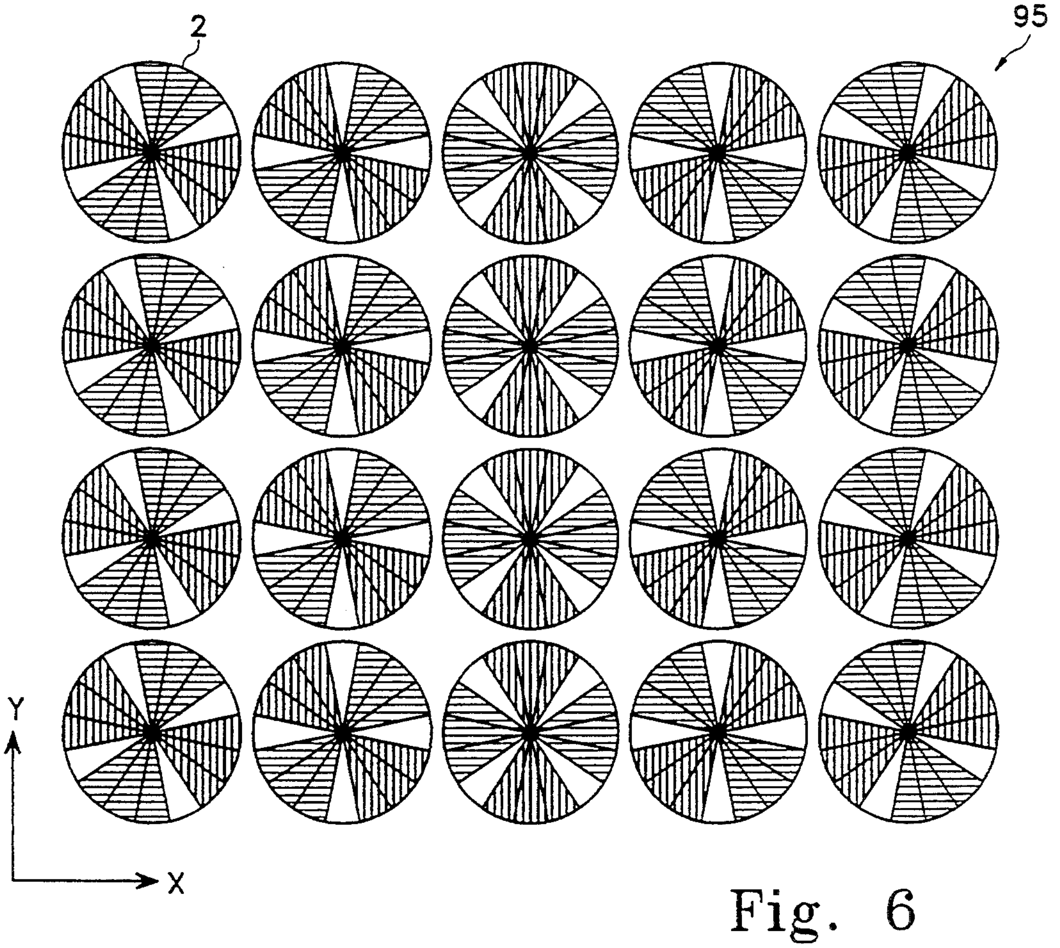
FIG. 6 is a front view of a 4×5 array of 16-segment radiating elements indicating how the elements of the array have different polarization phases.
Figure 7:
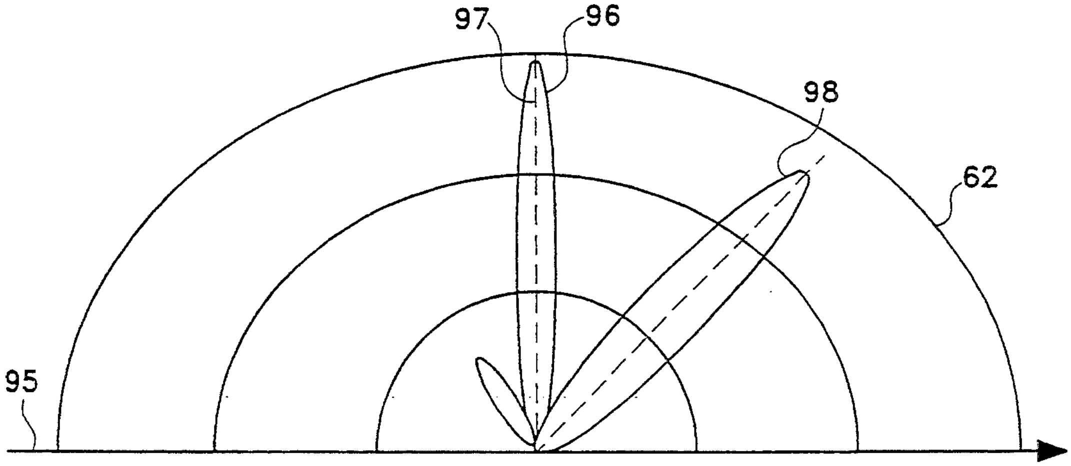
FIG. 7 is a diagram indicating the antenna patterns of two beam positions for an array of multi-segment elements.

A particular spatial pattern of relative polarization phase of the orientation across a 4×5 planar array 95 of twenty 16-segment radiating elements 2 is shown in FIG. 6. The effective angular orientation of the individual elements 2 (which corresponds to its relative polarization phase) is indicated by shading, with the dipole AB associated with signal modes A and B being indicated with vertical lines and the dipole CD associated with signal modes C and D being indicated by horizontal lines. By rotating the polarization phase of adjacent elements with respect to each other, the beam can be spatially scanned. In accordance with the present invention, each element 2 of 4×5 planar array 95 has four respective arms A, B, C and D respectively coupled to the four signal modes A, B, C and D appearing at the four ports A, B, C and D of beamforming network 5 (see FIG. 1); by selecting the appropriate segments used to form each arm A, B, C and D in accordance with a predetermined spatial pattern, the spatial orientation and therefore the polarization phase of each element 2 in planar array 95 is controlled. The direction of maximum radiation from planar array 95—the direction of the mainlobe—is that for which the waves from all of the radiating elements 2 are in phase and thus is a function of the predetermined spatial pattern. As is the case for each of the vertical columns of FIG. 6, when the polarization phase or effective angular orientation of all the elements 2 are the same, the result is a beam 96 whose y component is steered at broadside 97 (ie, perpendicular to the planar array 95).

When the polarization phases of the individual elements 2 are progressively shifted from one radiating element to the next, as is the case for each of the horizontal rows of FIG. 6, the direction of maximum radiation will be shifted in known fashion by a corresponding amount, as shown by resultant beam 98 which has its x component directed at a 45° angle away from broadside 97. In accordance with the known operational characteristics of phased array antennas, the relative magnitude of a resultant beam 98 when the planar array 2 is steered away from broadside 97 is less than that of resultant beam 96 at broadside 97.

Figure 8:
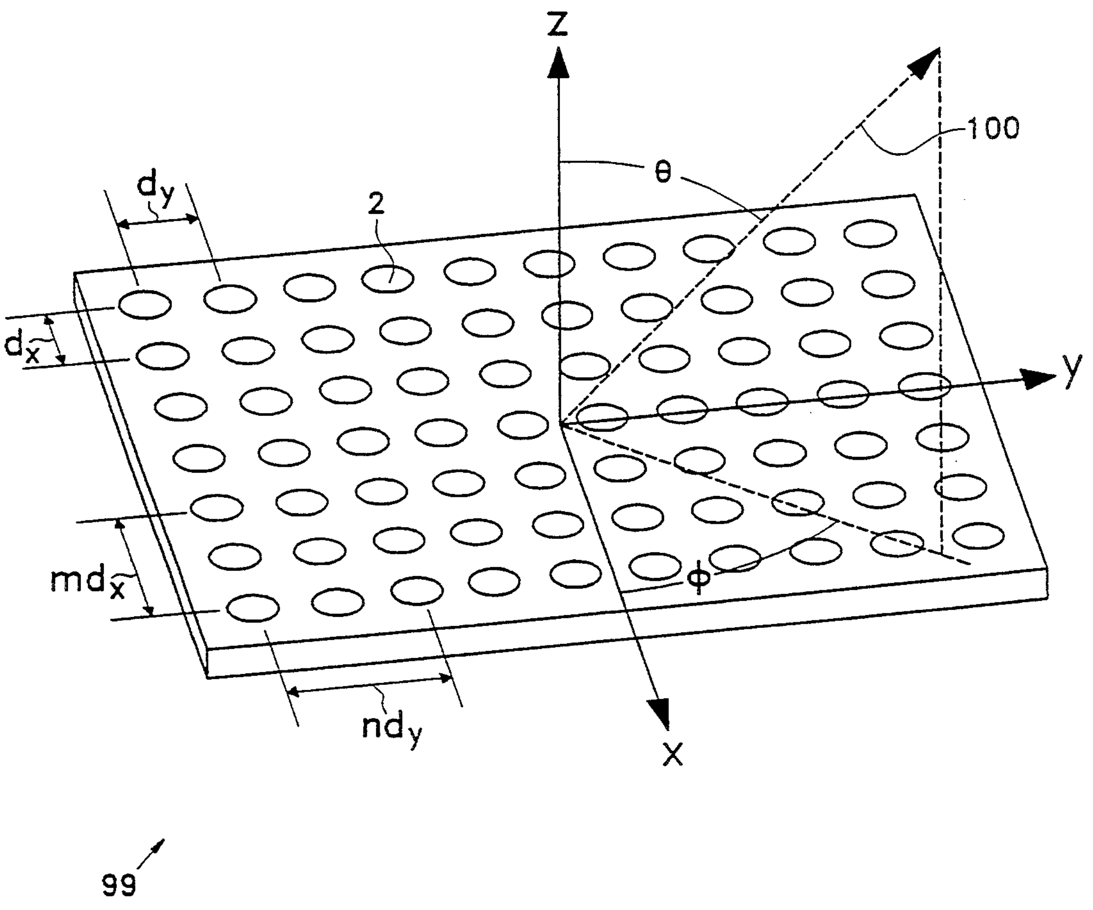
FIG. 8 is a view of a planar 10×7 array of radiating elements and a corresponding coordinate system.

As shown in FIG. 8, which shows the coordinate geometry of a 10×7 planer array 99 of radiating elements 2 spaced at a distance $d_y$ in the y direction and $d_x$ in the x direction, by appropriate selection of which of the segments 7–22 of each radiating element 2 is coupled to which of the four signal modes A, B, C and D, the relative polarization phases of the individual radiating elements 2 is varied and the resultant beam 100 can be steered in any desired direction Θ, φ within a large solid angle. Beam scanning is accomplished in known fashion by linear phase shifts along the array's x and y coordinates. As shown in FIG. 8 the layout of the radiating elements 2 is in the form of a rectangular lattice, with the mnth element being located at $x_m = md_x$ and $y_n = nd_y$. The elemental lattice spacing $d_x$ and $d_y$ can be chosen in known fashion to avoid the formation of grating lobes in visible space.

The antenna pattern of such a regular planar array is given by:

$$E(\theta,\phi) = G_e\left[\frac{\sin\left(N\frac{\pi d}{\lambda}\sin(\theta)\cos(\phi) + \delta_1\right)}{N\sin\left(\frac{\pi d}{\lambda}\sin(\theta)\cos(\phi) + \delta_1\right)}\right]\left[\frac{\sin\left(\frac{M\pi d}{\lambda}\sin(\theta)\cos(\phi) + \delta_2\right)}{M\sin\left(\frac{\pi d}{\lambda}\sin(\theta)\cos(\phi) + \delta_2\right)}\right]$$

where

E (Θ, φ) is the array pattern in the directions (Θ, φ);

$G_e$ is the gain of each element in the array;

N is the number of elements in the x direction;

M is the number of elements in the y direction;

d is the element spacing in both the x and y directions;

λ is the wavelength (in the same units as d);

$\delta_1$ is the phase shift between elements in the x direction; and $\delta_2$ is the phase shift between elements in the y direction.

The total gain of the array is approximately $$G=(M+N)G_e.$$

As with any antenna array, the gain is proportional to the element gain $G_e$. For cavity backed crossed dipoles, a typical gain is 9dBi.

Figure 9:
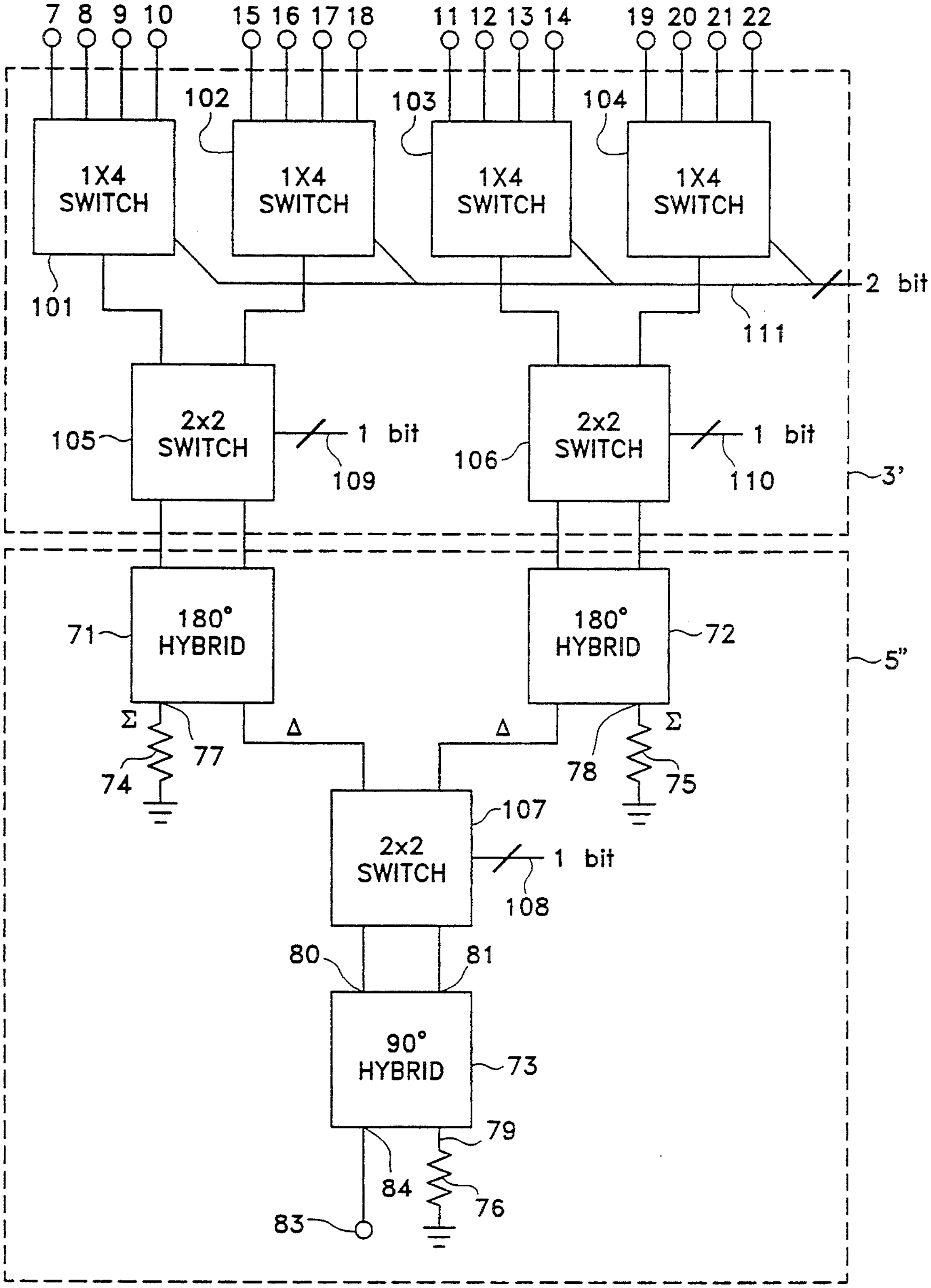
FIG. 9 is a block diagram of an alternate embodiment for the 4×16 switching matrix and associated bandforming network of FIG. 1.

FIG. 9 is a block diagram of an alternative switching matrix 3' and an alternative beamforming network 5'' in accordance with another embodiment of the invention, which is more economical and has lower losses than the 4×16 switching matrix 3 of FIG. 1, particularly if low noise amplifiers are included at values positions to reduce the system noise figure. Terminals 7–22 are coupled to similarly numbered segments 7–22 of the 16-segment radiating element 2 of FIG. 1. Switching matrix 3' and beamforming network 5'' cooperate to determine the relative polarization phase of the radiating element 2. In particular, switching matrix 3' includes four 1×4 switches 101, 102, 103, 104 and two 2×2 switches 105, 106; while beamforming network 5'' includes a 2×2 switch 107. This results in five available control bits with four bits selecting which of the 16 segments 7–22 is associated with the A signal mode, and the fifth bit selecting either a right-hand or a left-hand polarization sense by reversing the polarization of the CD arm relative to that of the AB arm.

Switches 101, 102, 103, 104 are each connected to four adjacent segments 7–10, 15–18, 11–14, 19–22 of 16-segment radiating element 2; 2×2 switches 105, 106 are each coupled between a respective 180° hybrid 71 and 72 and two of the four 1×4 switches 101, 102, 103, 104; switch 107 is coupled between the 90° hybrid 73 and the two 180° hybrids 71 and 72. A 1-bit control signal 108 associated with 2×2 switch 107 thus selects one of the two difference mode A-B or C-D; the two 1-bit control signals 109 and 110 select one of the two signal modes associated with the selected difference mode; and the 2-bit control signal 111 selects one of the four segments associated with each 1×4 switches 101, 102, 103, 104. Four control bits corresponding to 1-bit control signal 108, 2-bit control signal 111 and the 1-bit control signal 109 or 110 associated with the A and B signal modes thus select which of the 16 segments 7–22 is coupled to the A signal mode, with the fifth bit (the other 1-bit control signal 109 or 110 associated with the C and D signal modes) functioning to select either a right-hand or a left-hand polarization sense by reversing the polarization of the CD arm relative to that of the AB arm.

It will be appreciated by persons skilled in the art that the present invention is not limited to what has been shown and described hereinabove, nor the dimensions of sizes of the physical implementation described immediately above. The scope of invention is limited solely by the claims which follow.

What is claimed is:

1. A phased array antenna system for receiving or transmitting external circularly polarized radiation having a predetermined polarization sense, comprising:

a plurality of radiating elements mounted in respective rows and columns to thereby form a two dimension array, each radiating element in the array containing at least two perpendicular sets of two radially disposed opposing segments;

beamforming means for combining or deriving four mode signals respectively associated with four phase quadrature components of said external circularly polarized radiation into or from a single internal signal representative of said circularly polarized radiation; and switching means responsive to an external beam steering control signal and having at least four radiating element terminals respectively coupled to the segments of each of said radiating elements, for selecting which of said segments of the same radiating element will function as each of four arms of a respective crossed dipole antenna and for coupling the selected segments associated with each said arm of the same crossed dipole antenna to a different selected one of said four mode signals, to thereby determine a relative polarization phase of said same radiating element relative to the other radiating elements in the array.

2. The system claimed in claim 1, wherein said switching means and said beamforming means collectively comprise:

means for selecting one of said segments;

means for coupling a predetermined mode signal to the selected segment;

means for selecting a polarization sense; and means for connecting three other mode signals to segments oriented at 90°, 180° and 270° relative to the selected segment to thereby define a pair of crossed dipoles for receiving or transmitting a circularly polarized radio frequency field having the selected polarization sense.

3. The system claimed in claim 2, wherein said switching means further comprises:

control means for determining which segments are coupled to which mode signals in accordance with a predetermined timing and phase pattern for each radiating element.

4. The system claimed in claim 3, wherein at any predetermined time, said phase pattern defines a predetermined polarization phase shift from one radiating element to the next.

5. The system claimed in claim 1, wherein each said radiating element includes at least 4.N segment, where N is an integer greater than 2, and said switching means configures said radiating element in said crossed dipole configuration by coupling more than 1 but less than N segments to each of said mode signals, whereby said crossed dipole configuration includes two dipoles with each of said dipoles having two arms and each of said arms including at least two of said segments, whereby the phase resolution of each element is increased by permitting a phase shift equal to a predetermined fraction of the angle subtended by one dipole arm and the bandwidth of each element is increased by forming an arm subtending an angle equal to a predetermined multiple of the angle subtended by one segment.

6. The system claimed in claim 5, wherein said switching means further comprises: a 4×4.N configuration, where 4.N is the number of segments forming said crossed dipole pair.

7. The system claimed in claim 1, wherein said beamforming means further comprises:

three hybrid devices for combining said four mode signals into said internal signal representative of said circularly polarized radiation; and for converting said internal signal into said four mode signals.

8. The system claimed in claim 1, further comprising:

a transmitting means coupled to said beamforming means;

a receiving means also coupled to said beamforming means; and transmitting/receiving switching means coupled between said transmitting and receiving means for protecting said receiving means from said transmitting means.

9. The system claimed in claim 1, further comprising:

means for obtaining a finer phase shift resolution by changing the arrangement of segments forming each dipole arm.

10. The system claimed in claim 1, further comprising:

means for depositing said radiating elements and said switching means on one or more overlying layers of dielectric material.

11. The system claimed in claim 10, further comprising: means for depositing said beamforming means on said one or more overlying layers of dielectric material.

12. The system claimed in claim 10, further comprising: at least one low noise amplifier adjacent each of said radiating elements for reducing the overall system noise figure.

13. The system claim in claim 1, further comprising:

a receiver directly connected to a first port of the beamforming means associated with circularly polarized radiation having a first polarization sense; and a transmitter directly connected to a second port associated with circularly polarized radiation having a second polarization sense, whereby transmission and reception may occur simultaneously each with a different sense of polarization.

14. A method for antenna beam steering for a phased array of circularly polarized radiating elements, comprising the steps of:

associating each set of four mutually perpendicular radial segments of a designated radiating element with a respective pair of crossed dipoles;

selecting a segment of one of said pairs of crossed dipoles having an angular orientation corresponding to a desired relative polarization phase for said designated radiating element; and commutating four mode signals defining radiation having a predetermined polarization to the pair of said crossed dipoles including the selected segment, with a predetermined said mode signal coupled to said selected segment and the other three mode signals being coupled to the other three segments.

15. The method claimed in claim 14, further comprising the step of:

shifting the relative polarization phase of adjacent radiating elements by selecting a segment having a predetermined angular position relative to the selected segment of said designated radiating element in accordance with a stored table to provide a spatially scanned beam.

16. The method claimed in claim 14, further comprising the step:

determining the polarization sense of said circularly polarized signal.

17. The method claimed in claim 14, further comprising the step of:

increasing the bandwidth of said designated radiating element by feeding at least two adjacent segments of said radiating element with the same said mode signal to thereby form an arm having an angular extent equal to a multiple of the angle subtended by a single segment.

18. The method claimed in claim 17, further comprising the step of:

dividing said crossed dipole into at least eight of said radial segments, with each arm of the crossed dipole consisting of at least two adjacent segments.

19. The method claimed in claim 14, further comprising the step of: varying the number of segments associated with a single arm of different said crossed dipoles to obtain a finer phase resolution.

20. The method claimed in claim 14, further comprising the step of:

depositing said radiating element and any associated switching circuitry on one or more layers of dielectric material to form a conformal structure.

* * * * *